United States Patent [19]

Piché

[11] Patent Number: 4,637,138
[45] Date of Patent: Jan. 20, 1987

[54] FOODSTUFF SLICER

[76] Inventor: Richard Piché, 215 Saint-Lambert St., Valleyfield, Canada, J6T 1V1

[21] Appl. No.: 830,060

[22] Filed: Feb. 18, 1986

[51] Int. Cl.[4] .......................................... A21C 15/04
[52] U.S. Cl. ..................................... 30/114; 294/99.1
[58] Field of Search ................ 30/124, 114; 294/99.1, 294/7

[56] References Cited

U.S. PATENT DOCUMENTS

| | | | |
|---|---|---|---|
| 593,386 | 11/1897 | Williams | 30/114 |
| 2,182,726 | 12/1939 | King et al. | 30/114 |
| 2,600,646 | 6/1952 | Haugland | 30/114 |
| 2,770,035 | 11/1956 | O'Brien | 30/114 |
| 3,376,639 | 4/1968 | Pompini | 30/124 |
| 3,492,039 | 1/1970 | Chmela | 294/7 |
| 3,701,558 | 10/1972 | Baker | 294/99.1 |
| 4,411,066 | 10/1983 | Allahverdian | 30/114 |
| 4,553,325 | 11/1985 | Allahverdian | 30/114 |
| 4,592,139 | 6/1986 | Huang | 30/114 |

FOREIGN PATENT DOCUMENTS 246668  2/1926  United Kingdom ................. 30/124

Primary Examiner—Jimmy C. Peters

[57] ABSTRACT

A foodstuff slicer and server, comprising an integral band made of a rigid material, the band having three equally spaced transverse hinges and forming a lozenge structure defining a first pair of transversely opposite sides which constitute cutting blades, and a second pair of transversely opposite sides which constitute handles. A coil spring is secured to the handles to bias the angle of the cutting blades to a predetermined maximum value. Upon cutting foodstuff in a sector piece with the blades, the handles may be drawn one toward the other against the bias of the coil spring, first to determine the size of the foodstuff to be sliced, then to slice the foodstuff. Then the handles are slightly further drawn towards each other to secure the sector piece of foodstuff for transporting same. The sector piece of foodstuff is released upon release of the handles.

7 Claims, 3 Drawing Figures

FOODSTUFF SLICER

FIELD OF THE INVENTION

This invention relates to cake slicers and servers, to be used in the catering business and also for domestic use.

BACKGROUND OF THE INVENTION

In the catering business, quality of service is of utmost importance. When one goes to the restaurant, one expects superior food and service, otherwise, one will rather stay at home to eat at a minimal cost. Thus, the level of price of the meals and service are not as critical in such circumstances as the magic associated with a pleasant evening in a new surrounding.

Unfortunately, when a piece of cake has been ordered, even a well-meaning and conscientious waiter cannot always produce even slices of this cake with the conventional knives. It is also ungraceful for the waiter to not uncommonly have to use his fingers from one hand to support the piece of cake cut by the knife operated by the other hand, either when removing the sliced piece from the remaining cake or during transport of the sliced piece on its plate to the table of the customer.

The cake slicers that were found in the prior art do not seem to be widely accepted, since they are not prevalent in the industry. In prior art patents, the blade and the handles of the cake slicer always constitute distinct parts so as to thereby define at least three different body portions. For instance, in the U.S. Pat. No. 2,770,035 issued Nov. 13, 1956 to O'Brien, the cake slicer has two blades 10, 11, forming a V-shape, a releasable interconnecting rod 15 and two handle rods 18 and 28. The adjustment of the width of such a slice cutter is cumbersome and complex.

OBJECTS OF THE INVENTION

The main objects of the present invention are to provide a slicer and server capable of producing even slices of foodstuff, together with securing the sliced piece of foodstuff for transporting same.

An important object of the above disclosed device is that slicing and transporting of the foodstuff piece be done in the utmost hygiene.

Other objects of the above-mentioned device may be outlined as follows: simplicity of design, lightness, efficiency, easy and pleasant handling properties, machine washable with hot water, and of a design adapted for safe operation thereof.

SUMMARY OF THE INVENTION

The foodstuff slicer and server of the present invention comprises a pair of cutting blades, a first hinge means hinging together one end of said blades, the latter normally diverging from said first hinge means to a predetermined maximum included angle of less than 90°, a pair of handles, a second hinge means hinging one end of each handle to the opposite end of said blades, said handles converging from said second hinge means, third hinge means hinging together the opposite ends of said handles and biasing means to urge said said maximum included angle.

Preferably, the cutting blades are of equal length and also the handles so that the whole device makes a lozenge shape structure.

Preferably, the lower edges of the handles are upwardly offset from the cutting edges of the blades so as to provide room for the user's fingers at the end of the slicing operation.

Preferably, the biasing means include a coil spring having two diverging free end legs respectively fixed to the inner face of the handles, said coil spring also serving as said third hinge means.

DETAILED DESCRIPTION OF THE PREFERRED EMBODIMENT OF THE INVENTION

Figure 1:
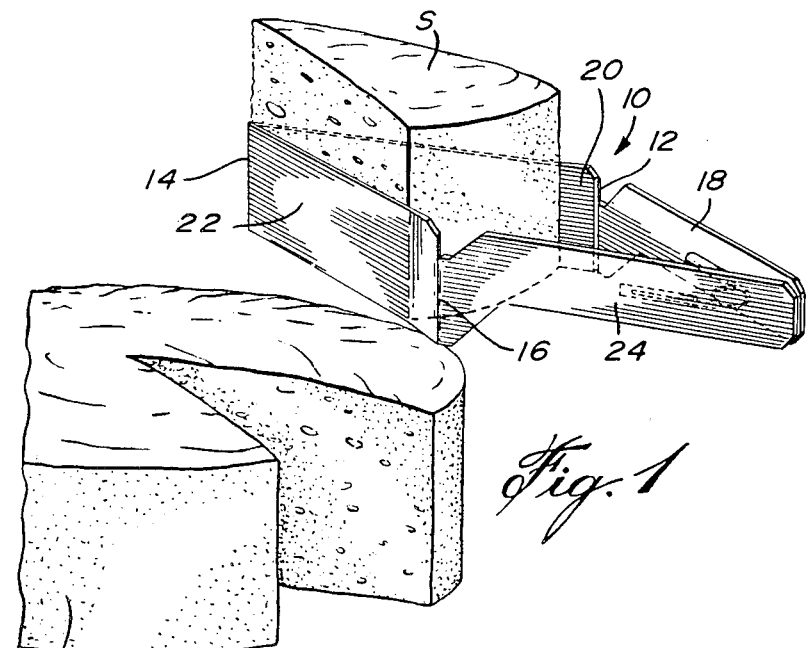
FIG. 1 is a downwardly-looking perspective view of a cake and of a slicer and server according to the preferred embodiment of the invention, said slicer having sliced said cake and removed a section thereof.

A cake C is shown in FIG. 1 having been cut, wherein the cut slice S is supported by a slicer and server 10 constructed accordingly with the teachings of the invention. The slicer 10 is constructed from a single elongated band of a light and resistant material such as plastic material, having three equally-spaced thinned-out sections 12, 14, 16, to allow relative movement of the thereby formed four equal-length legs 18, 20, 22, and 24.

Legs 18 and 24 form the free end portions of the slicer 10. Legs 18, 24, are relatively thick and are interconnected by biasing means, generally indicated by 26. Legs 20, 22, are relatively thin, and define a bottom cutting edge 28. Legs 20–22 are about twice as large in height than legs 18, 24, wherein legs 18, 24, are upwardly offset at 30 from the bottom cutting edges 28 of legs 20, 22, the top edge of legs 18 to 24 being in horizontal registry.

Figure 3:
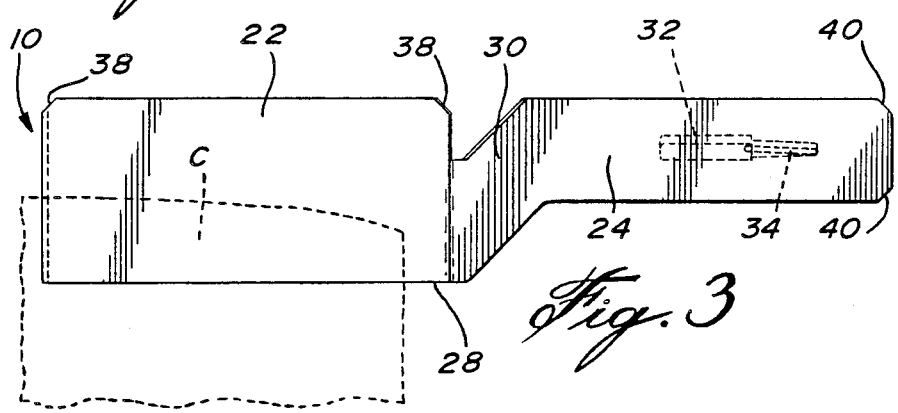
FIG. 3 is a side elevation of the device, with the shadow of a cake shown in dotted lines.

More precisely, offset portion 30 extends horizontally from blades 20, 22, for a slight distance before extending upwardly, as best seen in FIG. 3 of the drawings.

Legs 18, 24 are handles while legs 20, 22 are cutting blades. The offset portion 30 allows one's hand to hold handles 18, 24, when the cutting edges 28 of blades 20, 22, abut on a flat surface (FIG. 3), without having his knuckles striking that surface.

Biasing means 26 consists of two sockets 32, secured to the inner face of the handles 18 and 24, and opening toward the free ends of these latter legs, and a coil spring 34 having free end stems 36 which fit within sockets 32. Coil spring 34 is pre-biased so that its stems 36 bias the handles 18, 24 outwardly and therefore the cutting blades 20, 22, to a maximum included angle of less than 90°.

Figure 2:
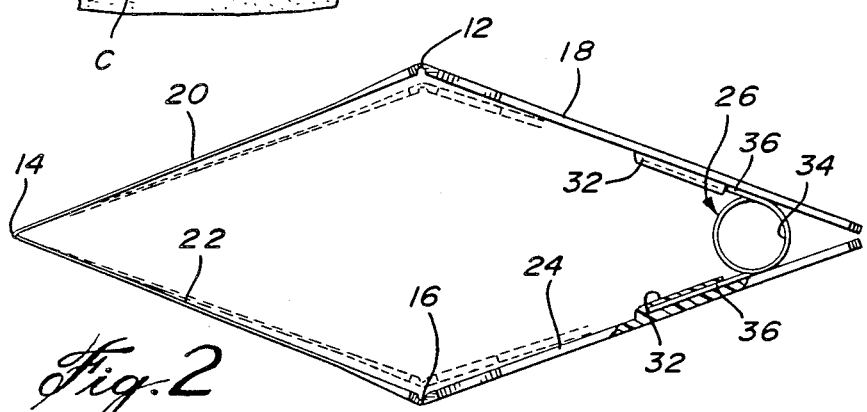
FIG. 2 is a top plan view of the device.

FIG. 2 shows that the device forms a lozenge shape structure: the blades 20, 22 being of equal length and also handles 18, 24.

Thinned out section 19 constitutes first hinge means hinging adjacent ends of blades 20, 22. Thinned out sections 12, 16 constitute second hinge means hinging one end of each handle 18, 24 to the opposite ends of blades 20, 22. Coil spring 34 also forms a third hinge means hinging together the opposite ends of the handles 18, 24.

By drawing with a hand the two inner end portions of handles 18, 24, one toward the other, one may accordingly adjust the dimensions of the portion of cake C to be sliced by blades 20–22. Blades 20–22 will not only slice the cake C, they will support the cake slice S to carry same to the kitchen plate provided one maintains appropriate pressure against the sides of that cake slice with the blades by drawing handles 18, 24, slightly one toward the other, against the bias of coil spring 34. Release of pressure on legs 18, 24, opens the device 10 at the position shown in FIG. 2.

Thus, there is no danger in dropping the sector piece S of cake on the floor, and hygiene is ensured since there is no need to support the sector piece of cake with fingers when carrying same. Advantageously, the top corners of blades 20, 22, are bevelled at 38, and the top and bottom corners of the free ends of handles 18, 24, are bevelled at 40 for comfort of the operator.

Of course, handles 18, 24, may be modified with an improved aesthetic design to provide a combined slicer and server that is more appealing. Device 10 is also adapted to be easily cleaned in any hot-water dishwasher. Furthermore, the device 10 can be of any color.

I claim:

1. A foodstuff slicer and server comprising a pair of cutting blades, a first hinge means hinging together one end of said blades, said blades normally diverging from said first hinge means to a predetermined maximum included angle of less than 90°, a pair of handles, second hinge means hinging one end of each handle to the opposite end of said blades respectively, said handles converging from said second hinge means, third hinge means hinging together the opposite ends of said handles, and biasing means to urge said blades to said maximum included angle.

2. A foodstuff slicer and server as defined in claim 1, wherein said third hinge means and said biasing means consist of a single coil spring located between said handles and having straight end stems fixed to said handles longitudinally thereof.

3. A foodstuff slicer and server as defined in claim 1, wherein said two blades and said two handles consist of a unitary rigid band of synthetic resin having three equally spaced transverse flexible portions of decreased thickness and defining said first and said second hinge means.

4. A foodstuff slicer and server as defined in claim 3, wherein said blades have cutting edges along their bottom longitudinal edges and the bottom longitudinal edges of said handles are upwardly offset from said cutting edges.

5. A foodstuff slicer and server as defined in claim 4, wherein the top longitudinal edges of said blades and handles lie in a substantially common plane.

6. A foodstuff slicer and server as defined in claim 5, wherein the top end corners of said blades and the top end bottom outer end corners of said handles are bevelled.

7. A foodstuff slicer and server as defined in claim 2, wherein the inner faces of said handles are provided with longitudinally extending sockets fixed to said handles and opening toward the rear end thereof, said straight end stems of said coil springs removably inserted within said sockets.

* * * * *